Sept. 17, 1968
I. I. SAZHIN
3,402,279
METHOD OF ELECTROEROSION MACHINING OF
HOLES WITH A CURVILINEAR AXIS
Filed Aug. 17, 1965
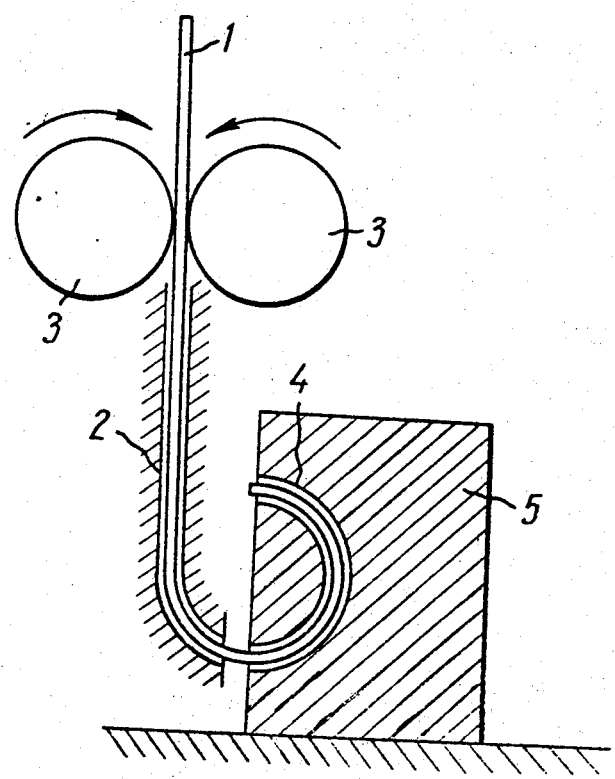
INVENTOR
IVAN I. SAZHIN
BY *Glascock Downing Seebold*
ATTORNEYS

United States Patent Office 3,402,279
Patented Sept. 17, 1968

3,402,279
METHOD OF ELECTROEROSION MACHINING OF HOLES WITH A CURVILINEAR AXIS
Ivan Ivanovich Sazhin, Fryazino, ul. Tsentralnaya 30, kv. 2, Oblast Schelkovsky Raion, Moscow, U.S.S.R.
Filed Aug. 17, 1965, Ser. No. 480,292
1 Claim. (Cl. 219—69)

ABSTRACT OF THE DISCLOSURE

The electroerosion machining of holes having a curvilinear axis by an electrode tool whose cross section and curvilinearity correspond to the cross section and curvilinearity of the hole to be machined. The required curvilinearity is imparted to the tool directly during the machining by passing the tool through a corresponding bending and guiding unit or jig.

The present invention relates to methods of electroerosion machining of holes with a curvilinear axis by means of an electrode tool whose cross section and curvilinearity correspond to the cross section and curvilinearity of the hole to be machined. Such methods have come into use in the machine-building industry and electronics.

In the art there are known methods of electroerosion machining of holes with a curvilinear axis by means of an electrode tool whose cross section and curvilinearity correspond to the cross section and curvilinearity of the hole to be machined.

In conformity to the known method, parts are machined on machine tools of complicated design provided with a rigid gear train intended to impart to the electrode tool the rotary and translatory motion. Besides, if the electrode tool should be of a complicated shape, there should be a strict conformity of its curvilinearity with the path of its movement, and the motion should be effected without a play. Whenever the tool is partially worn out, it must be replaced with a new one.

An object of the present invention is to eliminate the above-mentioned disadvantages.

The principal object of the present invention is the provision of such a method of electroerosion machining of holes with a curvilinear axis, which would permit machining with the aid of a tool of simple shape on a machine tool of a simple design with a constant renewal of the worn-out areas of the tool.

This object is accomplished by means of a method of electroerosion machining of holes with a curvilinear axis to be effected by the aid of an electrode tool whose cross section and curvilinearity correspond to the cross section and curvilinearity of the hole to be machined. According to the present invention, the electrode tool is given a desired curvilinear shape directly during the electroerosion machining by passing said tool through a corresponding bending and guiding device.

The machining of holes with a curvilinear axis according to the proposed method provides for using existing machine tools of a simple design with an electrode tool of a simple shape, does not require the strict conformity of the curvilinearity of the tool with the path of its motion, and allows an uninterrupted renewal of the worn-out areas of said tool. Besides, the method of the present invention may be adapted for machining holes in places difficult of access, due to the fact that the tool is bent directly at the point of machining the hole. In case of short-circuiting of electrodes (tool and part to be machined), the tool has imparted thereto motion, opposite to the initial direction, and any point of the tool exactly repeats its motion when passing through the bending and guiding device.

It is considered expedient to apply the proposed method with machining holes having a cross-sectional area from 0.03 to 4 sq. mm.

The appended drawing represents the schematic diagram of an embodiment of the method according to the present invention, comprising a device for bending and guiding the electrode tool.

A tool 1 is fed into a bending and guiding device or jig 2 by means of feeding rollers 3 that move the tool 1 and maintain the electrode gap within the prescribed limits. The jig 2 provides for bending the tool 1 according to the curvilinearity of the axis of a hole 4 to be machined in a part 5, and imparts to the tool 1 the required direction of the working feed.

The shape of the tool must be selected according to a profile of the hole to be machined.

What is claimed is:
1. A method of electroerosion machining of holes with a curvilinear axis by means of an electrode tool whose cross section and curvilinearity correspond to the cross section and curvilinearity of a hole to be machined, wherein the required curvilinearity is imparted to said tool directly during the electroerosion machining of holes by passing said tool through a corresponding bending and guiding device.

No references cited.

RICHARD M. WOOD, Primary Examiner.
R. F. STAUBLY, Assistant Examiner.